March 19, 1935. M. F. KILLORY 1,995,067
FISHING APPARATUS
Filed June 16, 1934
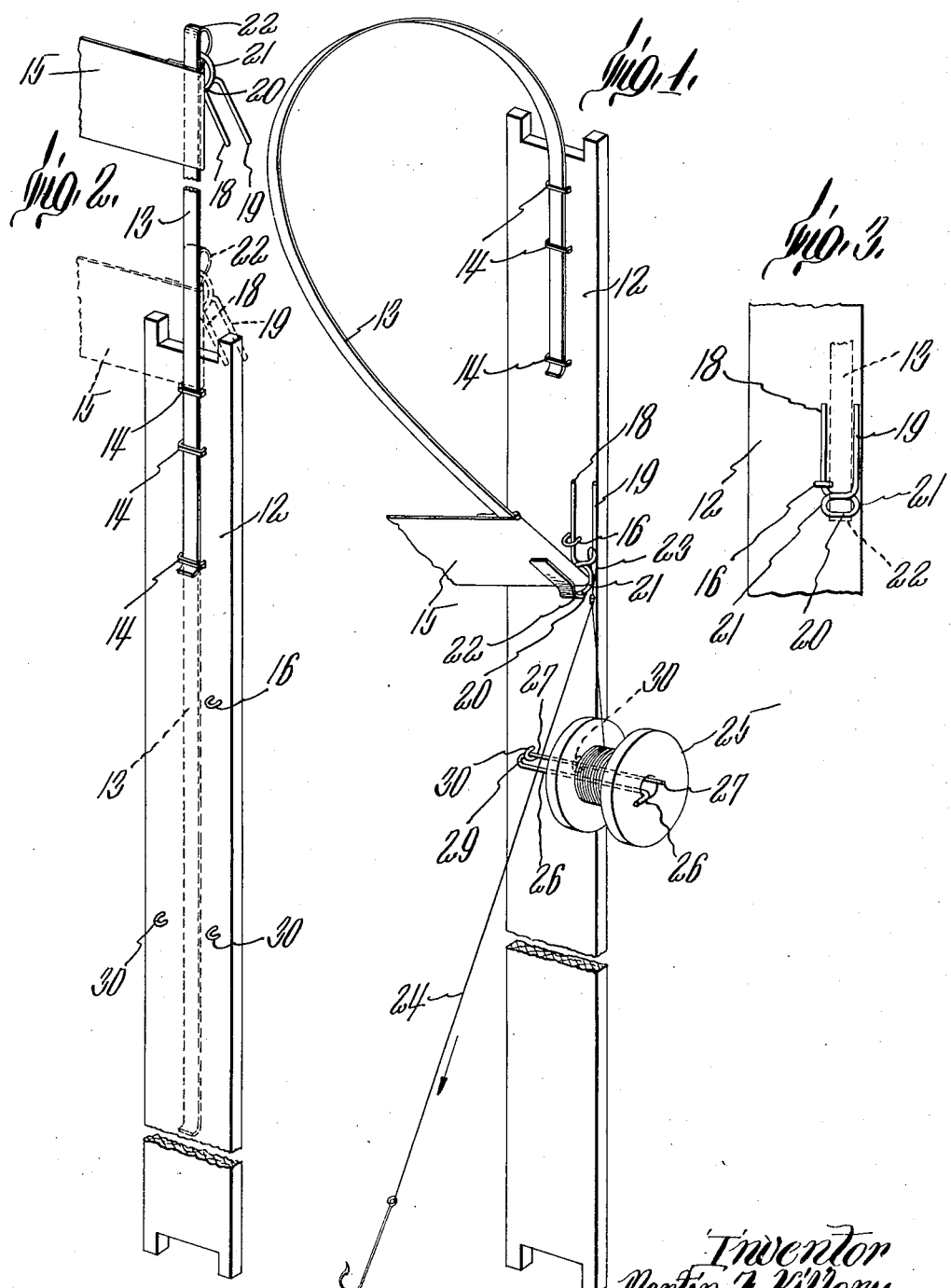
Inventor
Martin F. Killory
by Wright, Brown, Quinby & May
Attys Patented Mar. 19, 1935

1,995,067

UNITED STATES PATENT OFFICE 1,995,067

FISHING APPARATUS

Martin F. Killory, Brockton, Mass.

Application June 16, 1934, Serial No. 730,948

2 Claims. (Cl. 43—16)

The invention relates to apparatus for fishing through a hole cut in ice, and particularly to that class of apparatus which comprises a movable flag and supporting means therefor, the arrangement being such that the apparatus may be set with the flag in a concealed or inconspicuous position, and released and thrown upward automatically when a fish exerts a pull on the fish line of the apparatus.

The object of the invention is to provide a simple and effective apparatus at a minimum cost, and it consists in the improvements hereinafter described and claimed.

Of the accompanying drawing forming a part of this specification,—

Figure 1 is a perspective view of an apparatus embodying the invention showing the apparatus set to maintain the flag in an inconspicuous position.

Figure 2 is a perspective view showing the flag released and conspicuously displayed.

Figure 3 is a fragmental view showing the portions of the apparatus chiefly characterizing the invention.

The same reference characters indicate the same parts in all of the figures.

In the drawing 12 designates an elongated supporting bar which may be a flat sided strip of wood adapted to be fixed at one end in a body of ice beside a hole cut therein.

13 designates a resilient flag standard, preferably a strip of spring steel, engaged with the bar and preferably slidable thereon in guiding staples 14 fixed to the bar so that the standard, and a flag 15 fixed to one end thereof, may be moved upwardly endwise to project a free major portion and the flag above that end of the bar which is the upper end when the apparatus is in position for use, as indicated by full lines in Figure 2, and in the opposite direction to reduce the apparatus to compact form, as indicated by dotted lines.

16 designates a pin prong guide, preferably a staple, fixed to the bar 12 between the ends thereof.

The apparatus is characterized chiefly by a bifurcated pin including a closed looped end, and two spaced apart substantially parallel prongs 18 and 19 projecting from the looped end, which is preferably formed as best shown by Figure 3, by bending the wire of which the pin is made to provide a cross bar 20 and two neck portions 21 crossing each other. The cross bar 20 constitutes the pintle member of a hinge permanently connecting the bifurcated pin with a hinge socket member 22, preferably formed by bending back the terminal portion of the standard 13.

When the bar 12 is supported in a vertical position causing the flag-carrying end of the standard 13 to project above the upper end of the bar as shown by full lines in Figure 2, the standard is adapted to be flexed to depress the flag 15 and permit the prong 18 to move vertically upward into the prong guide 16 until the pin neck abuts the guide and causes the tension of the standard 13 to releasably maintain the flag depressed, and hold the prong 19 in position to permit the downward movement upon it of a loop 23 formed on a fish line 24.

The prongs 18 and 19 are now substantially vertical so that a relatively slight downward pull on the line is sufficient to cause the downward withdrawal of the prong 18 from the guide 16, and the withdrawal of the prong 19 from the loop 23. The standard 13 is thus left free to spring to the flag displaying position shown by Figure 2, and carry the bifurcated pin with it.

The prongs 18 and 19, although depressible by a weak pull on the line, are free from liability of being accidentally depressed to their withdrawn position by the action of wind on the flag.

Owing to the fact that the bifurcated pin is permanently hinged to the free end of the flag standard, the apparatus is adapted to be quickly and conveniently set in the position shown by Figure 1, it being necessary only to depress the pin sufficiently to permit the tension of the standard to force the prong 18 into the guide 16 as far as the pin neck will permit.

The surplus portion of the line 24 is preferably wound on a spool 25 removably mounted on a bent wire holder composed of arms 26 and 27 connected by a neck 29, and inserted in the bore of the spool. The arm 27 is removably inserted in staples 30 fixed to the bar 12. Said arms are normally sprung apart by the resilience of the neck 29 so that they collectively act as a brake preventing undesirable free rotation of the spool. The arm 26 is provided with a bent end 28 constituting a stop yieldingly confining the spool on the arms. When the apparatus is not in use the spool may be removed from the arms, and the arms from the supporting bar.

I claim:

1. In a fishing apparatus which includes an elongated supporting bar, a resilient flag standard slidably engaged with said bar and movable thereon to cause a free major portion of the standard to project from an end of the bar, a flag attached to the free end of the standard, the bar having a pin prong guide located below its upper end, and a bifurcated pin including a closed looped end permanently hinged to the free end of said standard, and two spaced apart substantially parallel prongs projecting from the looped end, the arrangement being such that when the bar is supported in a vertical position causing the flag-carrying end of the standard to project above the upper end of the bar, the standard is adapted to be flexed to depress the flag and permit the guide-engaging prong to move vertically upward into the prong guide until the pin neck abuts the guide and causes the tension of the standard to releasably maintain the flag depressed, and hold the other of said prongs in position to permit the downward movement of a fish line loop thereon, so that a downward pull on the line causes the downward withdrawal of the guide-engaging prong from the guide, and the withdrawal of the other prong from the loop, leaving the standard free to spring to a flag-displaying position and carry the bifurcated pin with it.

2. A fishing apparatus as specified by claim 1, comprising also a spool and a bent wire holder therefor composed of two arms adapted to enter the bore of the spool and a neck resiliently connecting said arms, one of the arms being slidably secured in staples fixed to the bar and the other arm having a bent end yieldingly opposing removal of the spool from the arms.

MARTIN F. KILLORY.